United States Patent
Smyth et al.

(10) Patent No.: US 12,465,404 B2
(45) Date of Patent: Nov. 11, 2025

(54) EXTERNAL FIXATION K-WIRE CLAMP AND CORRESPONDING METHOD OF USE

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventors: Scott Smyth, Memphis, TN (US); Steve Miller, Scotts Valley, CA (US)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

( * ) Notice: Subject to any disclaimer, the term of this patent is extended or adjusted under 35 U.S.C. 154(b) by 60 days.

(21) Appl. No.: 18/521,215

(22) Filed: Nov. 28, 2023

(65) Prior Publication Data
US 2024/0225699 A1 Jul. 11, 2024

Related U.S. Application Data

(60) Provisional application No. 63/437,824, filed on Jan. 9, 2023.

(51) Int. Cl.
*A61B 17/64* (2006.01)

(52) U.S. Cl.
CPC ...... *A61B 17/6458* (2013.01); *A61B 17/6425* (2013.01); *A61B 17/6466* (2013.01)

(58) Field of Classification Search
CPC . A61B 17/64; A61B 17/6425; A61B 17/6458; A61B 17/6466
See application file for complete search history.

(56) References Cited

U.S. PATENT DOCUMENTS

| | | | | |
|---|---|---|---|---|
| 4,848,368 A | * | 7/1989 | Kronner | A61B 17/66 606/57 |
| 5,108,394 A | * | 4/1992 | Kurokawa | A61B 17/66 606/59 |
| 5,393,161 A | * | 2/1995 | Mata | A61B 17/6416 403/112 |
| 5,437,667 A | | 8/1995 | Papierski et al. | |
| 5,624,440 A | * | 4/1997 | Huebner | A61B 17/645 606/54 |
| 5,752,954 A | | 5/1998 | Mata et al. | |
| 6,162,224 A | | 12/2000 | Huebner | |

(Continued)

FOREIGN PATENT DOCUMENTS

| | | |
|---|---|---|
| EP | 1661524 A1 | 5/2006 |
| WO | 2006013670 A1 | 2/2006 |

OTHER PUBLICATIONS

Synthes: Mini External Fixator—© 2006—Assembly and Surgical Technique, 12 pages.

*Primary Examiner* — Nicholas W Woodall
(74) *Attorney, Agent, or Firm* — KDW Firm PLLC

(57) ABSTRACT

An external fixation K-wire clamp including an elongated channel arranged and configured to receive a K-wire. In some examples, the elongated channel is devoid of any predefined grooves so that a K-wire can be positioned anywhere along the length of the elongated channel and/or in various orientations. In addition, and/or alternatively, an exemplary method of use for treating a distal radius fracture is disclosed. The method enabling earlier hand/wrist therapeutics.

7 Claims, 13 Drawing Sheets

(56) References Cited

U.S. PATENT DOCUMENTS

| | | | |
|---|---|---|---|
| 6,217,577 B1* | 4/2001 | Hofmann | A61B 17/6466 |
| | | | 606/57 |
| 6,409,729 B1* | 6/2002 | Martinelli | A61B 17/6466 |
| | | | 606/59 |
| 7,722,609 B2 | 5/2010 | Bordeaux | |
| 7,828,801 B2 | 11/2010 | Mirza et al. | |
| 8,123,747 B2 | 2/2012 | Hajianpour | |
| 8,998,902 B2 | 4/2015 | Hoffman et al. | |
| 11,457,980 B2 | 10/2022 | Bonny | |
| 2002/0077629 A1* | 6/2002 | Hoffman | A61B 17/6466 |
| | | | 606/59 |
| 2010/0222778 A1* | 9/2010 | Bagnasco | A61B 17/66 |
| | | | 606/58 |
| 2010/0262143 A1* | 10/2010 | Bordeaux | F16B 39/282 |
| | | | 606/54 |
| 2012/0089142 A1* | 4/2012 | Mullaney | A61B 17/6466 |
| | | | 606/54 |

* cited by examiner

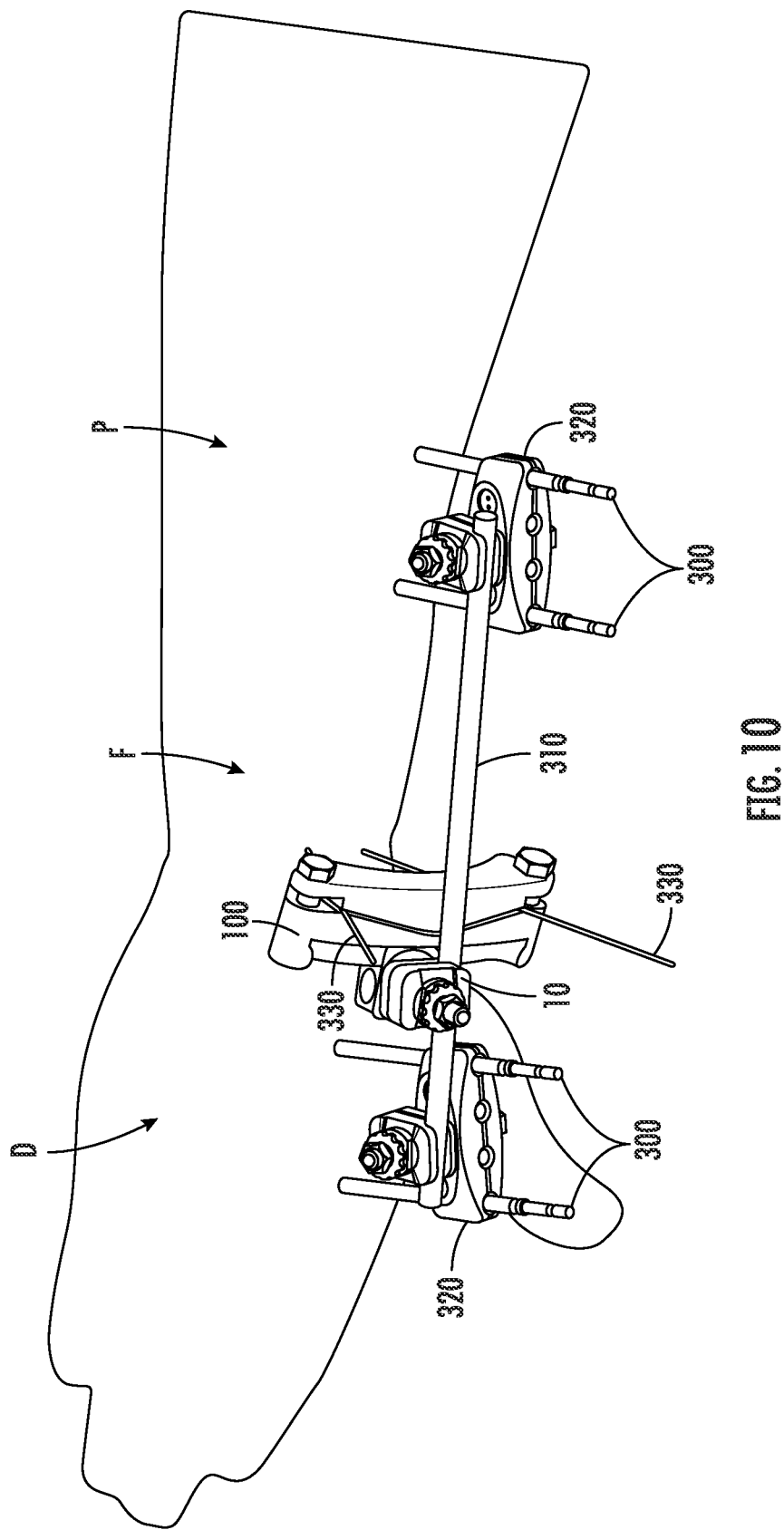

EXTERNAL FIXATION K-WIRE CLAMP AND CORRESPONDING METHOD OF USE

CROSS-REFERENCE TO RELATED APPLICATIONS

This is a non-provisional of, and claims the benefit of the filing date of, U.S. provisional patent application No. 63/437,824, filed Jan. 9, 2023, entitled "External Fixation K-Wire Clamp and Corresponding Method of Use," the entirety of which application is incorporated by reference herein.

FIELD OF THE DISCLOSURE

The present disclosure relates generally to orthopedic devices, systems, and methods for facilitating fracture alignment, and more particularly to an external fixation clamp arranged and configured to secure a Kirschner Wire (e.g., a K-wire).

BACKGROUND OF THE DISCLOSURE

People suffer bone fractures each year. In many instances, a person that suffers a bone fracture is required to use a bone alignment device such as, for example, an external fixation system to align two or more bones, bone fragments, bone pieces, etc. (terms used interchangeably herein without the intent to limit or distinguish). For example, thousands of injuries are reported annually with patients having complex or comminuted fractures of the distal radius, ulna, and carpals/metacarpals. Fractures of this type often occur due to high-energy traumatic events such as, for example, car accidents, falls, or sporting events.

When such cases are presented at the hospital, physicians must often decide between non-surgical and surgical treatment options, which often are dependent on the severity of the injury. Non-surgical treatment generally includes applying a cast to the patient's wrist to stabilize and hold the patient's anatomy in-place during healing. More severe fractures and injuries, however, often involve displacement of bone, which requires a surgical approach to restore proper anatomical alignment. To accomplish this, the physician may need to manipulate the displaced bone. Once the bone has been properly reset, the bone is fixed in place using, for example, one or more bone fixation plates or an external fixation system or construct. In use, the external fixation system or construct can be used to either permanently fix the patient's bone during healing or temporarily hold the patient's bone until such time that a permanent bone fixation plate can be implanted. Thus, if a surgical treatment is required, typically the treating physician can either implant an internal bone fixation plate such as, for example, a volar plate, or couple an external fixation system or construct, which can remain in place during the entire healing period or temporarily until an internal bone fixation plate can be implanted. As a result, in use, external fixation systems or constructs can be used to stabilize a patient's bone either as a permanent or temporary treatment option.

Generally speaking, external fixation systems or constructs utilize a plurality of components that physicians can use to couple patient's bones. Constructs may include, for example, one or more spanning rods or bars (terms used interchangeably herein without the intent to limit), a plurality of threaded half-pins used to engage a patient's bone, one or more rod-to-rod clamps used to intercouple spanning rods together, and one or more rod-to-pin clamps, also referred to as multi-pin clamps, used to couple the threaded half-pins to the spanning rod. In use, physicians may also utilize one or more Kirschner Wires (e.g., K-wires) to manipulate patient's bones.

For example, referring to FIG. 1, an example of a known rod-to-rod clamp 10 is shown. As illustrated, the rod-to-rod clamp 10 includes first and second mini-clamps 12 coupled by a threaded bolt and nut assembly 14. In use, each mini-clamp 12 includes a channel 16 arranged and configured to receive a spanning rod therein. As will be appreciated by one of ordinary skill in the art, in the unlocked position, the mini-clamps 12 can be swiveled or rotated to provide the physician with flexibility when coupling to the spanning rod. In use, tightening of the threaded bolt and nut assembly 14 fixes the position of the mini-clamps 12 relative to each other and secures the position of the spanning rod within the channel 16.

Referring to FIG. 2, an example of a known rod-to-pin clamp 20 is shown. As illustrated, the rod-to-pin clamp 20 includes a rod-attachment clamp 22 including a channel 24 arranged and configured to receive the spanning rod therein and a pin clamp 26 arranged and configured to receive one or more threaded half-pins therein. As illustrated, the pin clamp 26 includes a plurality of spaced-apart grooves, recesses, channels, etc. 28 for receiving the threaded half-pins. That is, as will be readily appreciated by one of ordinary skill in the art, the rod-to-pin clamp 20 includes a plurality of grooves 28 for securing one or more parallel threaded half-pins, which may be implanted into a patient's bone.

Referring to FIG. 3, an example of a known K-wire clamp 30 is shown. As illustrated, the K-wire clamp 30 includes a rod-attachment clamp 32 including a channel 34 arranged and configured to receive the spanning rod 40 therein and a K-wire clamp 36 arranged and configured to receive one or more K-wires therein. As illustrated, the K-wire clamp 36 includes a plurality of spaced-apart grooves, recesses, channels, etc. 38 for receiving the K-wires 42. That is, as will be readily appreciated by one of ordinary skill in the art, the K-wire clamp 30 includes a plurality of grooves 38 for securing one or more parallel K-wires 42, which may be implanted into a patient's bone.

One drawback of existing external fixation clamps is their inability to integrate both threaded half-pins and multiple K-wires at non-parallel angles into the same external fixation system or construct. As a result, external fixation of the distal radius is often only performed to temporarily stabilize the patient's anatomy until an additional, second surgical procedure can be performed to implant a permanent fixation solution such as, for example, implantation of an internal bone fixation plate. In return, this further increases the likelihood of fracture site infection.

It would be beneficial to provide an external fixation clamp that is capable of securing, affixing, or the like one or more K-wires at various relative angles. Specifically, it would be beneficial to provide an external fixation clamp that provides physicians with greater flexibility in positioning the one or more K-wires relative to the K-wire clamp. It is with respect to this and other considerations that the present disclosure may be useful.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An external fixation K-wire clamp is disclosed. In use, the external fixation K-wire clamp is arranged and configured to be used in an external fixation system including, inter alia, a spanning rod, a K-wire, optional rod-to-rod clamps, rod-to-pin clamps, threaded pins, etc.

In some examples, the external fixation K-wire clamp includes an elongated channel configured to receive a K-wire, the external fixation K-wire clamp being devoid of any predefined grooves for receiving the K-wire (e.g., the contacting or abutting surfaces defining the elongated channel do not include any predefined grooves for receiving the K-wire) so that the K-wire can be positioned anywhere along a length of the elongated channel and/or can be orientated in various orientations such as, for example, angled relative to the contacting or abutting surfaces defining the elongated channel (e.g., the K-wire can be orientated in any one of a plurality of different orientations). For example, the external fixation K-wire clamp is configured to receive and secure one or more K-wires that are positioned non-parallel to the contacting or abutting surfaces defining the elongated channel.

In any preceding or subsequent example, the contacting or abutting surfaces of the external fixation K-wire clamp may be configured to simultaneously receive and secure the various positions of a plurality of K-wires inserted therein. In use, the plurality of K-wires can be parallel to each other. Alternatively, the plurality of K-wires can be angled relative to each other (e.g., non-parallel) so long as the K-wires do not overlap with each other (planar but non-parallel K-wires). Alternatively, the plurality of K-wires can be non-planar K-wires.

In any preceding or subsequent example, the contacting or abutting surfaces of the external fixation K-wire clamp may include a roughened, bead blasted, or diamond knurled surfaces.

In any preceding or subsequent example, wherein the external fixation K-wire clamp includes a main body including a first contacting or abutting surface and a mechanism for coupling the external fixation K-wire clamp to a spanning rod, a plate member including a second contacting or abutting surface parallel to the first contacting surface, and a mechanism for moving the plate member relative to the main body to selectively secure the position of a K-wire between the contacting or abutting surfaces (e.g. within an elongated channel between the first and second contacting surfaces).

In any preceding or subsequent example, wherein the mechanism for moving the plate member relative to the main body includes a plurality of fasteners (e.g., screws) coupling the plate member to the main body.

In any preceding or subsequent example, wherein the external fixation K-wire clamp includes a plurality of biasing members positioned about the plurality of fasteners, respectively, in-between the plate member and the main body for biasing the plate member away from the main body. In any preceding or subsequent example, the biasing members are a compression or coiled spring.

In any preceding or subsequent example, wherein the first and second contacting or abutting surfaces are parallel to each other but angled relative to the main body and the plate member. Thus arranged, non-planar pins may be utilized.

In any preceding or subsequent example, wherein the main body and the plate member inclusive of the first and second contacting or abutting surfaces are curved.

In any preceding or subsequent example, wherein the mechanism for coupling to the spanning rod comprises a rail formed in, or affixed to, the main body of the external fixation K-wire clamp, the rail being arranged and configured to be received by a channel formed in a rod-to-rod clamp. In some examples, the rail enables repositioning of the external fixation K-wire clamp by enabling the external fixation K-wire clamp to be connected at any point along a length of the rail for optimal positioning of the K-wire.

In any preceding or subsequent example, wherein the mechanism for coupling to the spanning rod comprises a slot formed in the external fixation K-wire clamp, the slot arranged and configured to receive a plate member associated with a mini rod clamp.

In any preceding or subsequent example, wherein the mechanism for coupling to the spanning rod comprises a mini-rod clamp including a threaded bolt arranged and configured to threadably engage a threaded opening formed in the external fixation K-wire clamp.

A method of treating a distal radius fracture is also disclosed. The method including inserting one or more proximal pins into a patient's radius, inserting one or more distal pins into a patient's carpal or metacarpal bone such that the fracture is positioned in-between the one or more proximal pins and the one or more distal pins, coupling the one or more proximal pins and the one or more distal pins to a spanning rod, the spanning rod extending across the fracture, coupling an external fixation clamp such as, for example, an external fixation K-wire clamp, to the spanning rod, inserting a fixation element such as, for example, a K-wire, into a fracture site including the fracture, securing the fixation element (e.g., K-wire) to the external fixation clamp (e.g., external fixation K-wire clamp), removing, after a consolidation period, the one or more distal pins to enable the patient to begin hand/wrist therapeutics while the one or more proximal pins and the fixation element (e.g., K-wire) remain implanted, and removing, post-healing, the one or more proximal pins, the fixation element (e.g., K-wire), and the spanning rod.

In any preceding or subsequent example, wherein the one or more proximal pins are coupled to the spanning rod using a proximal rod-to-pin clamp. The one or more distal pins are coupled to the spanning rod using a distal rod-to-pin clamp.

In any preceding or subsequent example, wherein the external fixation clamp (e.g., external fixation K-wire clamp) is moved to a desired position to orientate and guide the implantation of the fixation element (e.g., K-wire) into the affected bony anatomy (e.g., the fracture site).

In any preceding or subsequent example, wherein the external fixation clamp (e.g., external fixation K-wire clamp) is moved to reorient the patient's bone to appropriate anatomical position.

In any preceding or subsequent example, wherein a plurality of fixation elements (e.g., K-wires) are inserted, the external fixation clamp (e.g., external fixation K-wire clamp) is configured to simultaneously secure positions of the plurality of fixation elements (e.g., K-wires).

In any preceding or subsequent example, wherein at least one of the plurality of fixation elements (e.g., K-wires) is non-parallel to a second one of the plurality of fixation element (e.g., K-wires).

In any preceding or subsequent example, wherein the plurality of fixation elements (e.g., K-wires) are in a non-parallel plane (e.g., not in a plane that is parallel) to the spanning rod.

Examples of the present disclosure provide numerous advantages. For example, by providing an external fixation K-wire clamp that can secure a K-wire including in a non-parallel configuration, physicians are provided with increased flexibility during construct assembly. In addition, by enabling the K-wire to be fixedly secured to the external fixation system or construct, increased stiffness can be provided. In addition, and/or alternatively, by utilizing an external fixation system or construct to treat a patient's distal radius fracture, definitive treatment can be achieved in severe high-energy fractures without requiring additional surgery to implant a bone fixation plate (e.g., a volar plating system). Moreover, by enabling the distal pins and pin clamp to be removed after an initial consolidation period, patients can undergo hand/wrist therapeutics earlier (e.g., enable earlier range of motion).

Further features and advantages of at least some of the examples of the present disclosure, as well as the structure and operation of various examples of the present disclosure, are described in detail below with reference to the accompanying drawings.

BRIEF DESCRIPTION OF THE DRAWINGS

By way of example, specific examples of the disclosed device will now be described, with reference to the accompanying drawings, in which:

FIG. 10 illustrates a top perspective view of an external fixation system or construct including the external fixation K-wire clamp shown in FIG. 9, the external fixation system or construct being used to affix a distal radius fracture in accordance with one or more features of the present disclosure.

Figure 1:
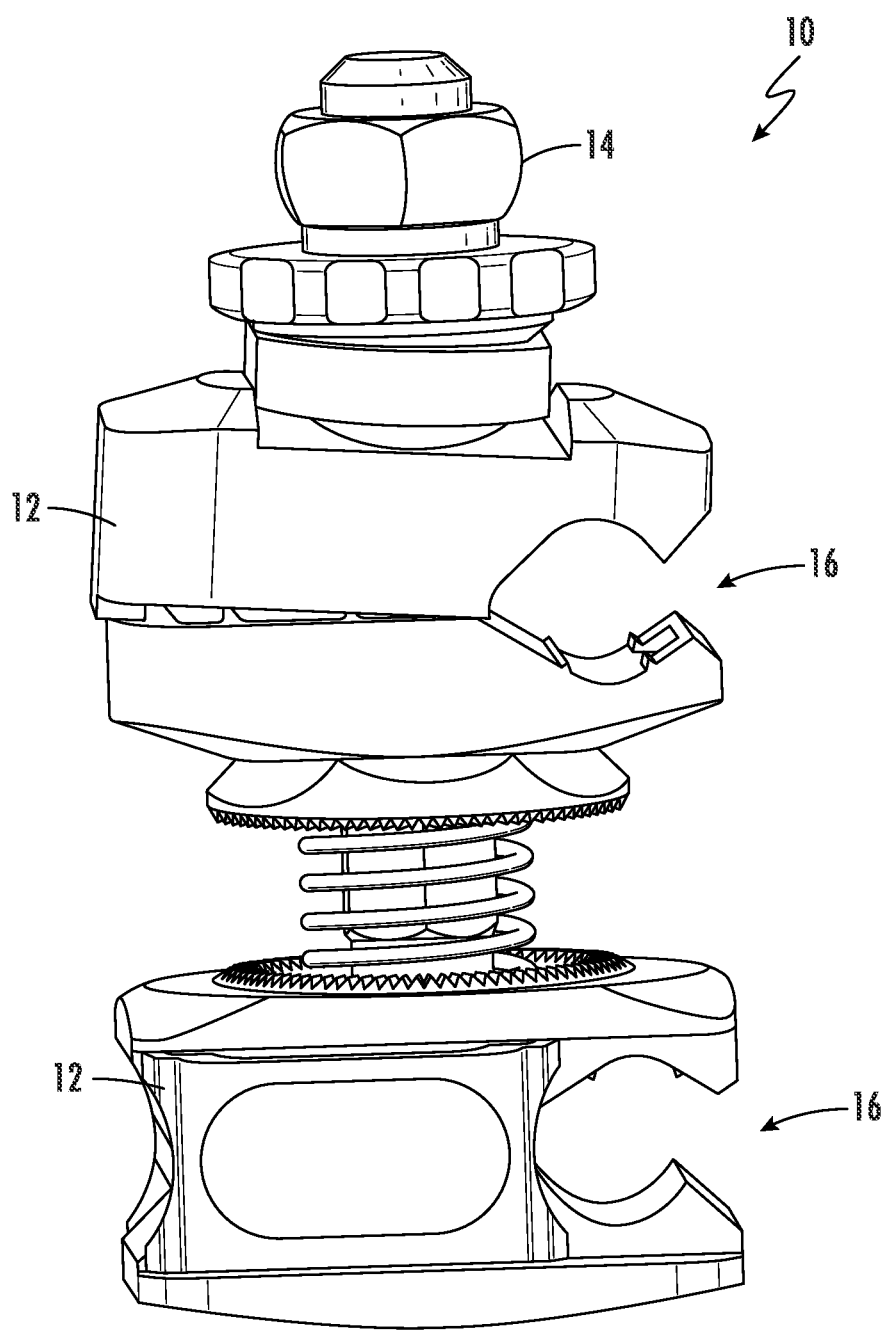
FIG. 1 illustrates a perspective view of a conventional rod-to-rod clamp.
Figure 2:
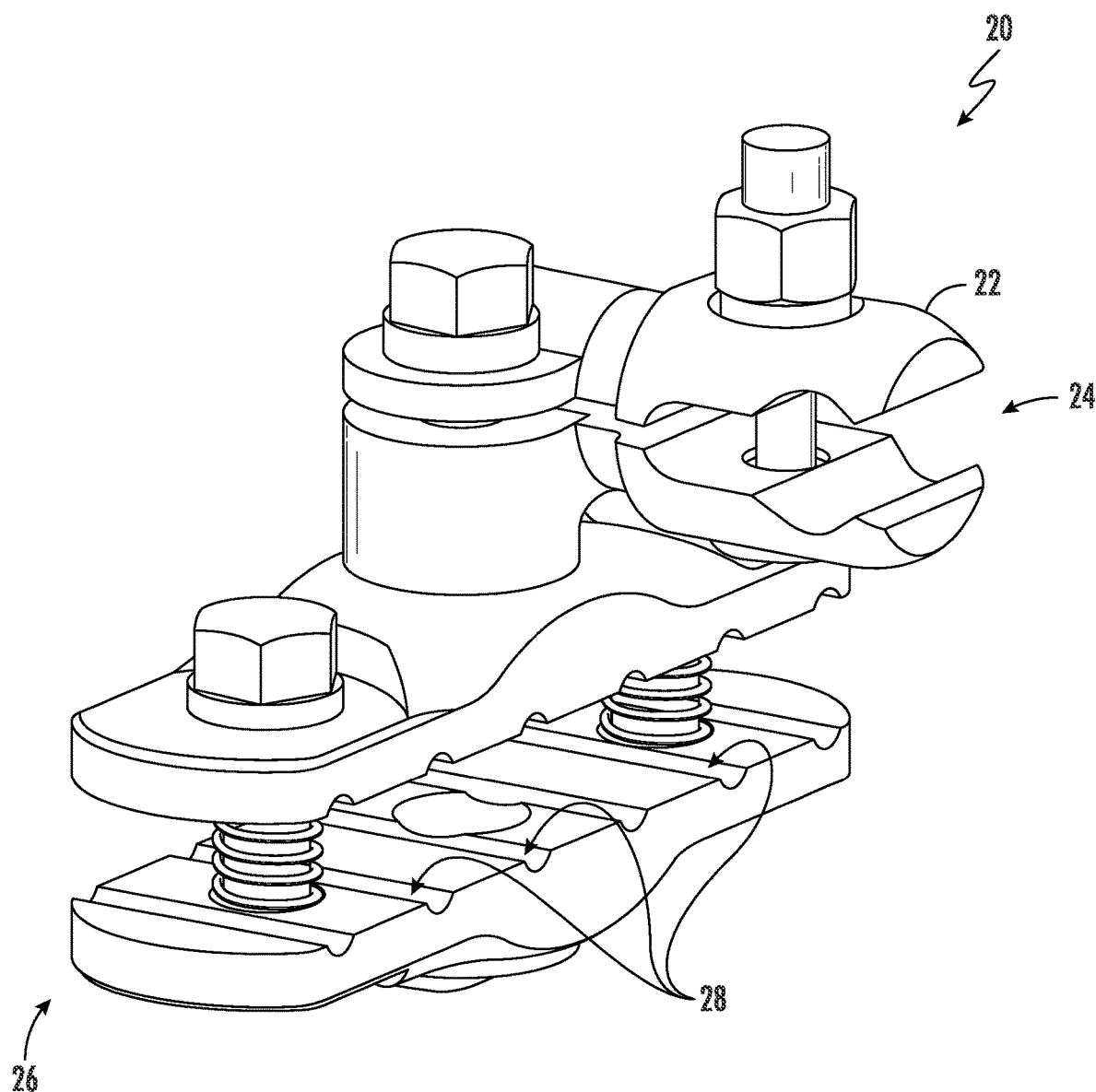
FIG. 2 illustrates a perspective view of a conventional rod-to-pin clamp.
Figure 3:
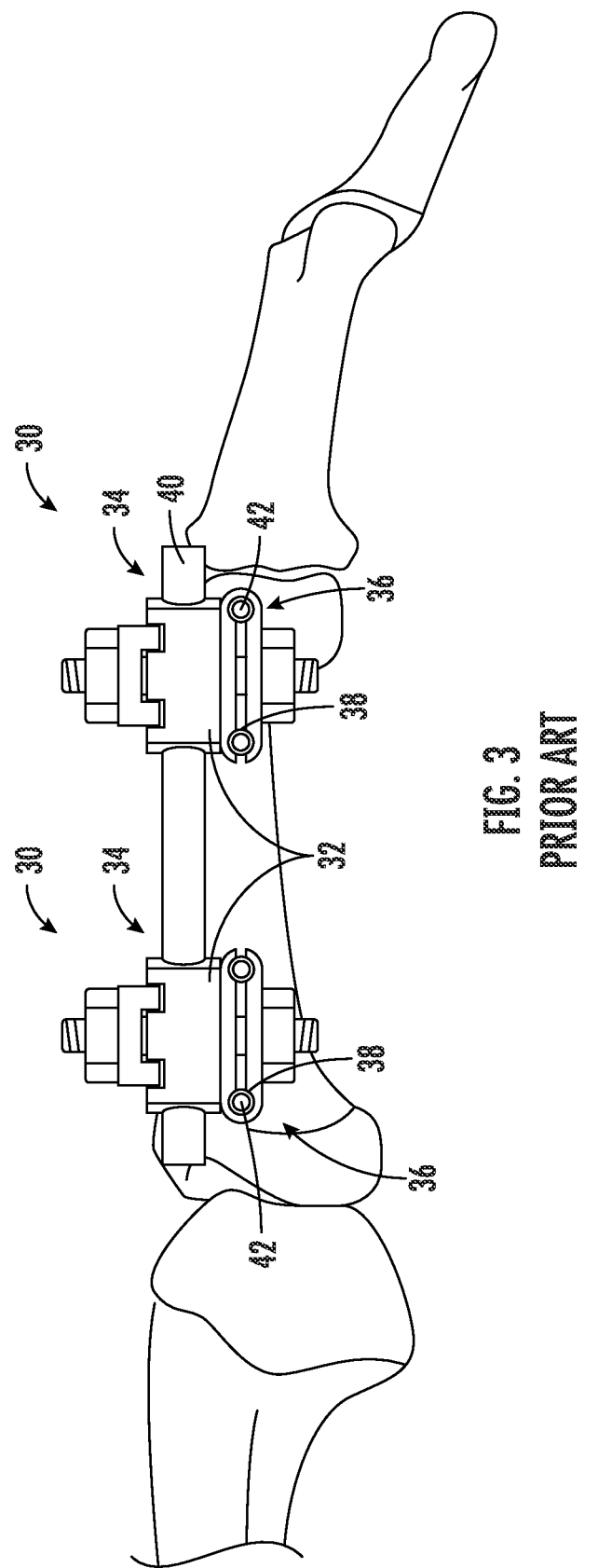
FIG. 3 illustrates a perspective view of a conventional external fixation construct including multiple K-wire clamps.
Figure 4A:
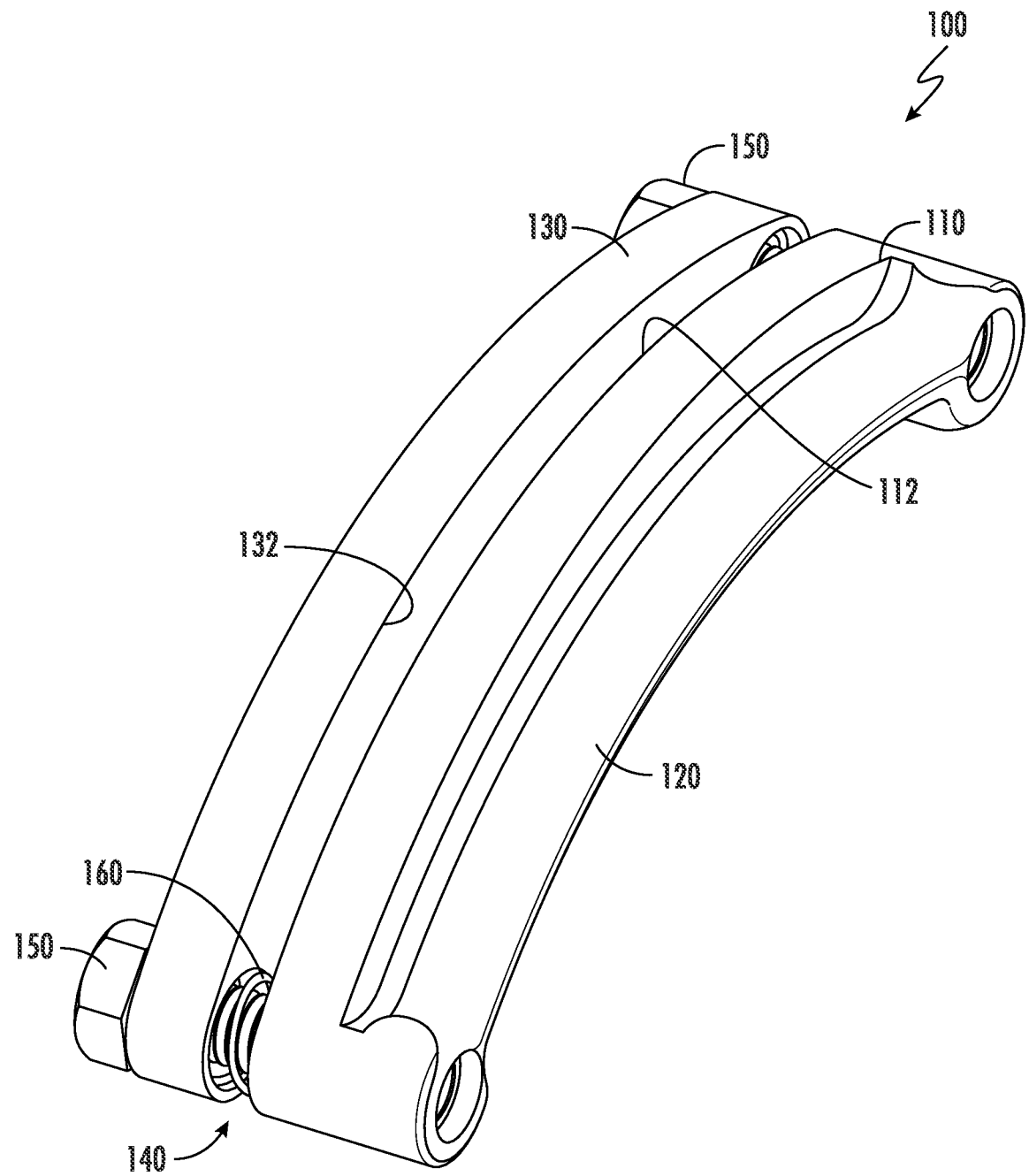
FIG. 4A illustrates a perspective view of an example of an external fixation K-wire clamp in accordance with one or more features of the present disclosure.
Figure 4B:
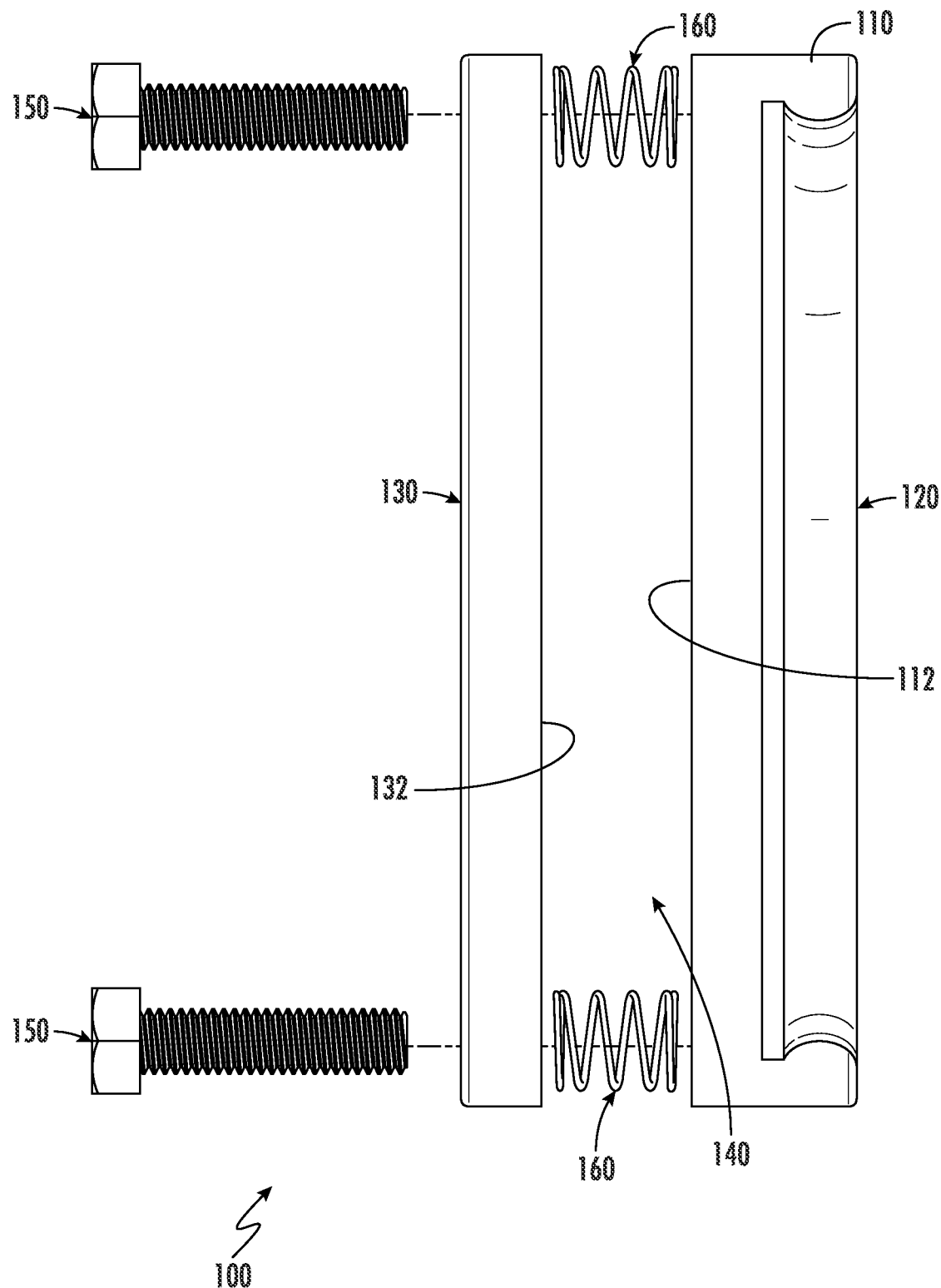
FIG. 4B illustrates an exploded view of the external fixation K-wire clamp shown in FIG. 4A.
Figure 4C:
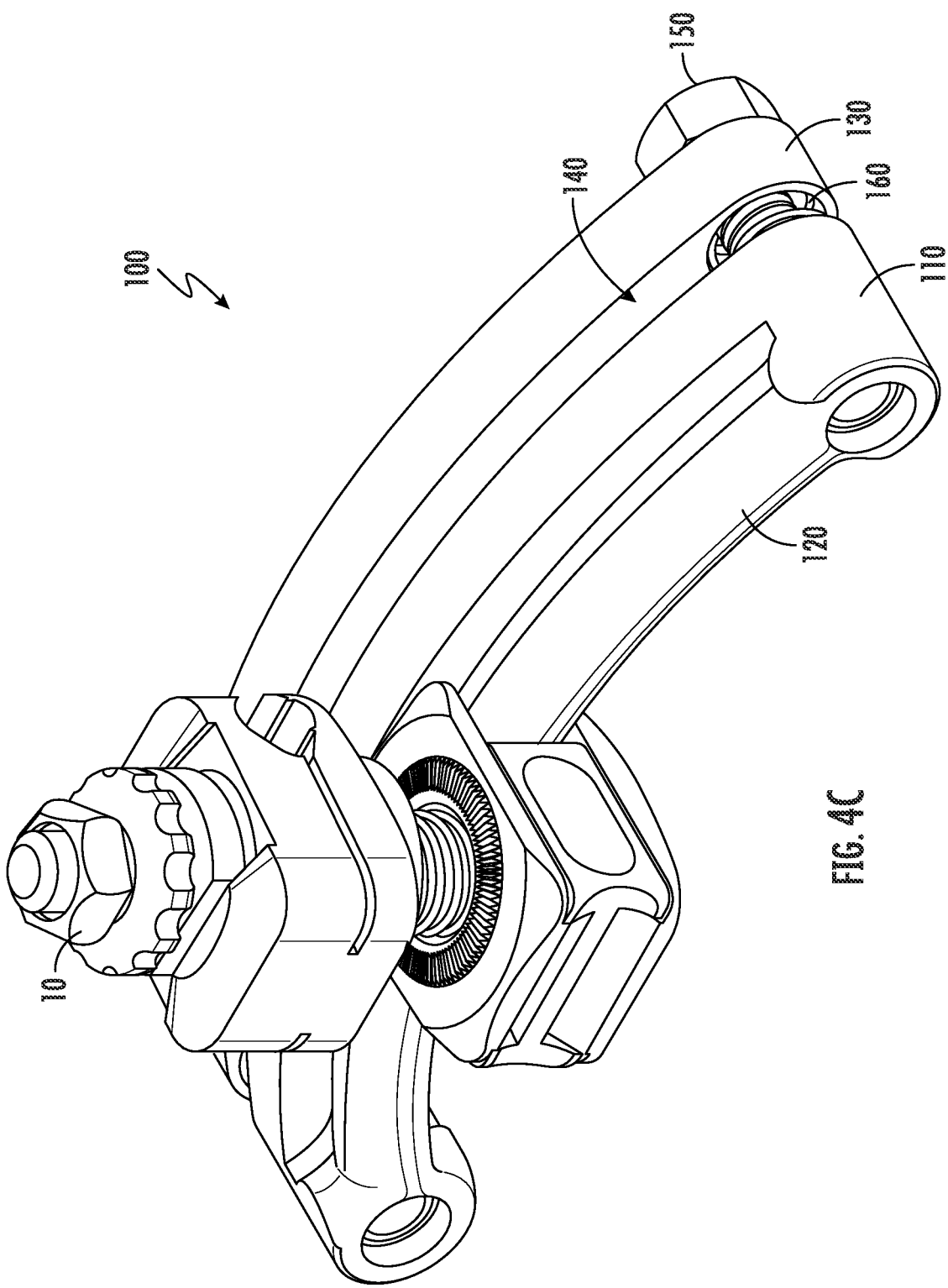
FIG. 4C illustrates a perspective view of the external fixation K-wire clamp shown in FIG. 4A, the external fixation K-wire clamp being coupled to the rod-to-rod clamp shown in FIG. 1.
Figure 4D:
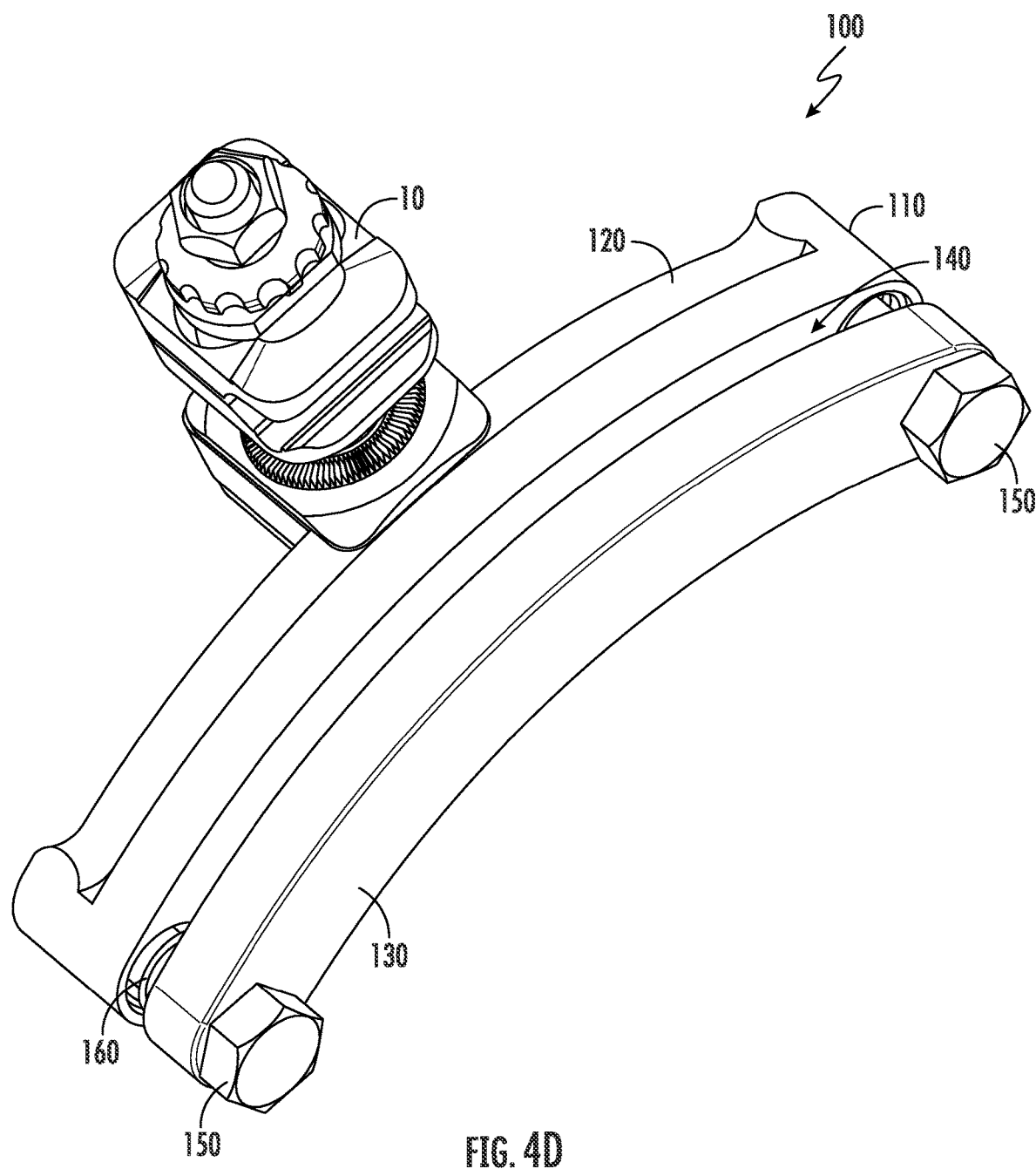
FIG. 4D illustrates an alternate, perspective view of the external fixation K-wire clamp shown in FIG. 4A being coupled to the rod-to-rod clamp shown in FIG. 1.

The drawings are not necessarily to scale. The drawings are merely representations, not intended to portray specific parameters of the disclosure. The drawings are intended to depict various examples of the disclosure, and therefore are not considered as limiting in scope. In the drawings, like numbering represents like elements.

DETAILED DESCRIPTION

Various features or the like of an external fixation clamp or a K-wire clamp (referred to herein as an external fixation K-wire clamp) will now be described more fully herein with reference to the accompanying drawings, in which one or more features of the external fixation K-wire clamp will be shown and described. It should be appreciated that the various features may be used independently of, or in combination with, each other. It will be appreciated that the external fixation K-wire clamp as disclosed herein may be embodied in many different forms and may selectively include one or more concepts, features, or functions described herein. As such, the external fixation K-wire clamp should not be construed as being limited to the specific examples set forth herein. Rather, these examples are provided so that this disclosure will convey certain features of the external fixation K-wire clamp to those skilled in the art.

In accordance with one or more features of the present disclosure, an external fixation K-wire clamp includes an elongated slot or channel arranged and configured to receive a K-wire. In use, contrary to conventional external fixation clamps such as, for example, conventional K-wire clamps that include one or more predefined grooves for receiving K-wires, the elongated channel of the external fixation K-wire clamp of the present disclosure is devoid of any recesses, grooves, channels, etc. (e.g., the abutting surfaces do not include any predefined grooves for receiving the K-wire). Thus arranged, the K-wire can be positioned anywhere along the length of the elongated channel. In addition, and/or alternatively, the elongated channel enables the K-wire to be orientated in any orientation such as, for example, angled relative to the contacting or abutting surfaces of the elongated channel of the external fixation K-wire clamp. That is, in use, the external fixation K-wire clamp is configured to grip a K-wire anywhere along the length of the elongated channel in any number of different orientations. As such, the physician is provided with increased flexibility in constructing the external fixation system or construct.

In addition, and/or alternatively, in accordance with one or more features of the present disclosure, the external fixation K-wire clamp can be used in an external fixation system or construct that spans the patient's wrist (e.g., the external fixation K-wire clamp can be used in an external fixation system or construct used to treat a patient's distal radius fracture). In use, the external fixation system or construct includes a plurality of clamps such as, for example, rod-to-pin clamps, to secure the patient's radius and the patient's carpal or metacarpal bones (e.g., the external fixation system or construct includes first and second clamps to secure the proximal and distal sides of a patient's fracture). Thereafter, an external fixation K-wire clamp can be coupled to the construct and a K-wire can be used to secure or couple to one of the patient's bones in the wrist (e.g., metacarpal bones, fracture fragments of the distal radius). The patient's bone can be reset to its proper position and the position of the K-wire can be secured to the construct. Next, in some examples, after adequate consolidation, the distal clamp and the corresponding distal pins can be removed leaving in place the proximal clamp and corresponding proximal pins and the external fixation K-wire clamp and corresponding K-wire. Thus configured, the patient can commence earlier hand/wrist therapeutics.

With reference to FIGS. 4A-4D, an example of an external fixation K-wire clamp 100 in accordance with one or more features of the present disclosure is shown. As illustrated, the external fixation K-wire clamp 100 includes a main body 110 and a plate member 130. In use, the plate member 130 is coupled to the main body 110. In addition, as will be described in greater detail below, the plate member 130 is moveable relative to the main body 110 to define an elongated channel 140 between the main body 110 and the plate member 130 to selectively enable a K-wire to be secured within the elongated channel 140 between the plate member 130 and the main body 110.

The plate member 130 may be coupled to the main body 110 via any suitable connection mechanism now known or hereafter developed. In some examples, as illustrated, the plate member 130 may be coupled to the main body 110 via fasteners (e.g., threaded screws) 150. For example, as illustrated, in some examples, the plate member 130 may be coupled to the main body 110 via first and second fasteners 150, with the first fastener 150 positioned at one end of the external fixation K-wire clamp 100 and the second fastener 150 positioned at the other end of the external fixation K-wire clamp 100. In use, the plate member 130 may include non-threaded openings to enable the fasteners 150 to pass freely therethrough while the main body 110 includes threaded screw holes for threadably engaging the fasteners 150. It should be appreciated that while the external fixation K-wire clamp 100 has been shown and described with two fasteners, more or less fasteners may be used (e.g., the location and quantity of fasteners along the clamp can be changed to change the balance of clamping force).

In some examples, biasing members 160 such as, for example, compression springs, coil springs, or the like, may be positioned about the fasteners 150 between the plate member 130 and the main body 110. Thus arranged, the biasing members 160 bias the plate member 130 away from the main body 110 when the fasteners are not tightened (e.g., an unlocked position) to maintain the elongated channel 140 opened so that a K-wire can be inserted into the elongated channel 140 in-between the plate member 130 and the main body 110. Thereafter, once the K-wire has been properly implanted, the fasteners 150 can be rotated to move (e.g., compress) the plate member 130 against the main body 110 to secure the K-wire between the plate member 130 and the main body 110. In some examples, the elongated channel 140 can be used to guide placement and insertion of the K-wire.

As illustrated, the main body 110 includes an abutting or contacting surface 112 (terms used interchangeably herein without the intent to limit or distinguish). Similarly, the plate member 130 includes a contacting surface 132. In use, the contacting surface 112 of the main body 110 and the contacting surface 132 of the plate member 130 are parallel to each other. Thus arranged, in accordance with the various features of the present disclosure, the external fixation K-wire clamp 100 can be used to affix one or more K-wires. In the illustrated example, the main body 110 inclusive of the contacting surface 112 and the plate member 130 inclusive of the contacting surface 132 are curved thus facilitating placement about the patient's wrist.

In addition, and/or alternatively, in accordance with one or more features of the present disclosure, the contacting surfaces 112, 132 of the main body 110 and the plate member 130 are devoid of any grooves for predefining areas for receiving the K-wire. Thus arranged, the elongated channel 140 defined by the space between the contacting surfaces 112, 132 can receive one or more K-wires including non-parallel K-wires (e.g., K-wires may be orientated or angled relative to the contacting surfaces 112, 132). For example, the elongated channel 140 can receive one or more K-wires anywhere along a length of the elongated channel 140 and/or can receive a K-wire in any orientation so long as, if a plurality of K-wires are utilized, the K-wires do not overlap each other within the elongated channel 140.

Figure 9:
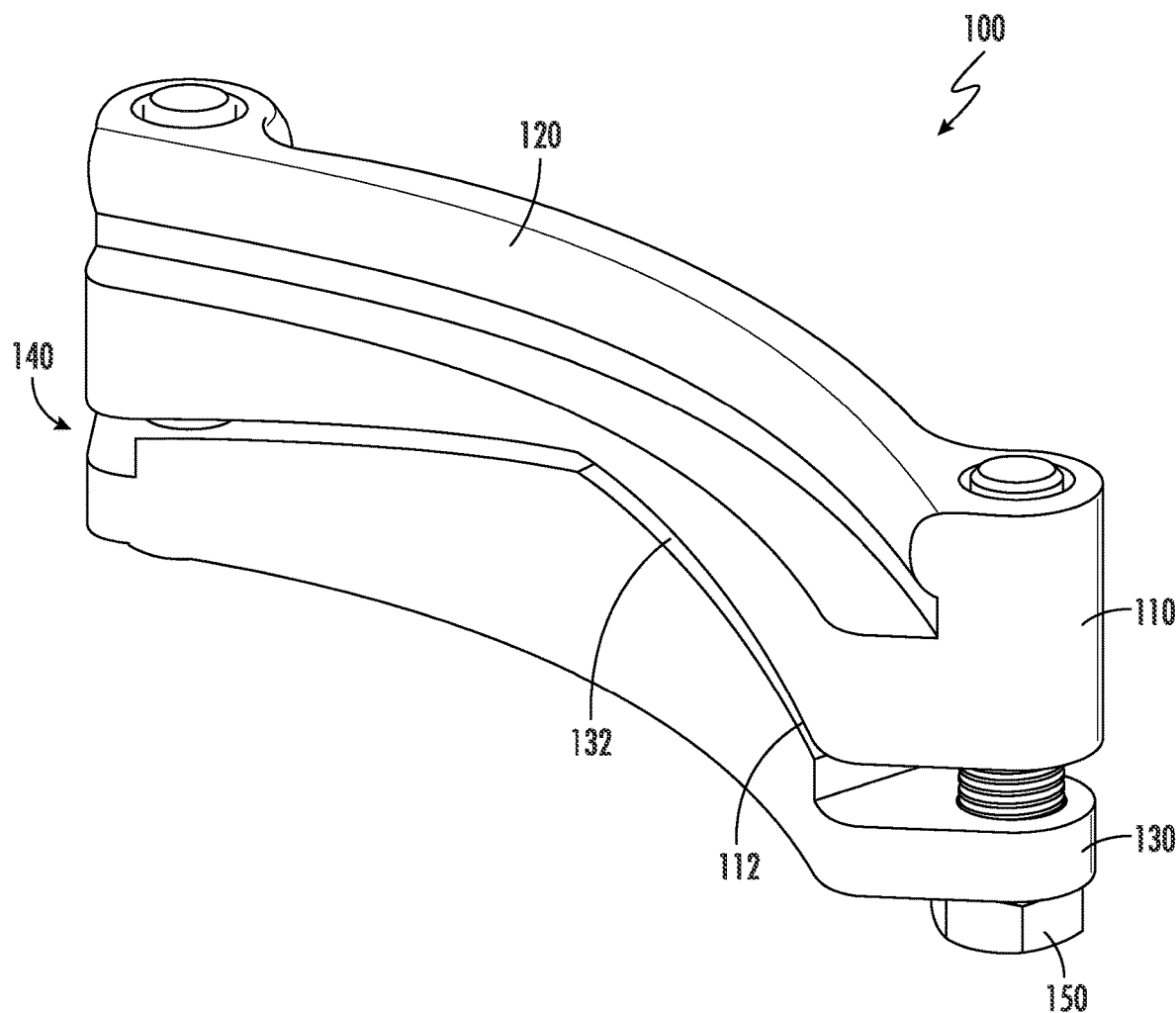
FIG. 9 illustrates a perspective view of an alternate example of an external fixation K-wire clamp in accordance with one or more features of the present disclosure.

In some examples, the plurality of K-wires received within the elongated channel 140 may be in the same plane, however such is not necessary, and the K-wires can be in different planes. For example, as illustrated, the K-wires can be randomly orientated in a plane that is non-parallel to the spanning rod of an external fixation construct or system as will be described in greater detail below. That is, in some examples, the K-wires can be non-parallel with each other so long as they do not overlap each other within the elongated channel 140. In some examples, the plurality of K-wires can be orientated in a single plane, but at an angle relative to each other. In other examples, the contacting surfaces 112, 132 may be parallel to each other, however the contacting surfaces 112, 132 may not be in a single plane or may be curved, which leads to non-planar K-wires (e.g., see FIG. 9, which illustrates the contacting surfaces 112, 132 parallel to each other while angled relative to the main body 110 and plate member 130). That is, the K-wires can be arranged and configured as non-planar K-wires as generally illustrated by the clamp of FIG. 9 and/or planar but non-parallel K-wires as generally illustrated by the clamp of FIGS. 4A-4D, 5, and 6).

In addition, in some examples, the elongated channel 140 defined by the space between the contacting surfaces 112, 132 can simultaneously receive and secure the various positions of a plurality of K-wires inserted therein. In particular, the external fixation K-wire clamp 100 enables simultaneous fixation of a plurality of K-wires within the elongated channel 140 even if the K-wires are non-parallel with each other so long as they do not overlap each other within the elongated channel 140. That is, in use, the external fixation K-wire clamp 100 is configured to grip a plurality of K-wires anywhere along the length of the elongated channel 140 with any number of different orientations including non-parallel as long as the K-wires do not overlap with each other. As such, the physician is provided with increased flexibility in constructing the external fixation system or construct.

In addition, in some examples, the external fixation K-wire clamp 100 includes a mechanism for coupling to a spanning rod of an external fixation construct or system. In use, the mechanism can be any suitable mechanism now known or hereafter developed. For example, as illustrated, the external fixation K-wire clamp 100 may include a rail 120. For example, the main body 110 may include a rail 120 positioned opposite the contacting surface 112. In addition, and/or alternatively, in some examples, the rail 120 may be integrally formed with the external fixation K-wire clamp 100 such as, for example, the main body 110. Alternatively, the rail 120 may be separately formed and coupled thereto. In use, the rail 120 enables a conventional rod-to-rod clamp such as, for example, rod-to-rod clamp 10, to receive the main body 110, and hence the external fixation K-wire clamp 100, and thus to couple the external fixation K-wire clamp 100 to a spanning rod (e.g., the rail 120 may include an arcuate diameter or shape arranged and configured to be received within the channel 16 of a conventional mini-clamp 12 of a rod-to-rod clamp 10). Incorporation of the rail 120 allows physicians to use the same external fixation K-wire clamp 100 for either left- or right-handed fracture fixation as the external fixation K-wire clamp connection can be made at any point along the length of the rail for optimal positioning of simultaneous dorsal and radial fixation of the K-wire. In addition, and/or alternatively, incorporation of the rail 120 allows physicians to selectively orientate the external fixation K-wire clamp 100 relative to the spanning rod since the external fixation K-wire clamp connection can be made at any point along the length of the rail thereby providing surgeons with increased flexibility in constructing the external fixation construct. In some examples, the rail 120 may have a diameter of 6 mm.

In some examples, the external fixation K-wire clamp 100 and/or the K-wire can be manufactured from any suitable material now known or hereafter developed. In some examples, the external fixation K-wire clamp 100 and K-wire can be manufactured from the same material while in other examples, the external fixation K-wire clamp 100 and K-wire can be manufactured from different materials. In some examples, the material may be selected to provide the needed rigidity or ductility.

In some examples, external fixation K-wire clamp 100 may include a cutting surface or edge formed thereon. For example, one or more of the contacting surfaces 112, 132 may include a cutting surface or edge integrated therewith to facilitate cutting of the K-wires as needed.

Figure 5:
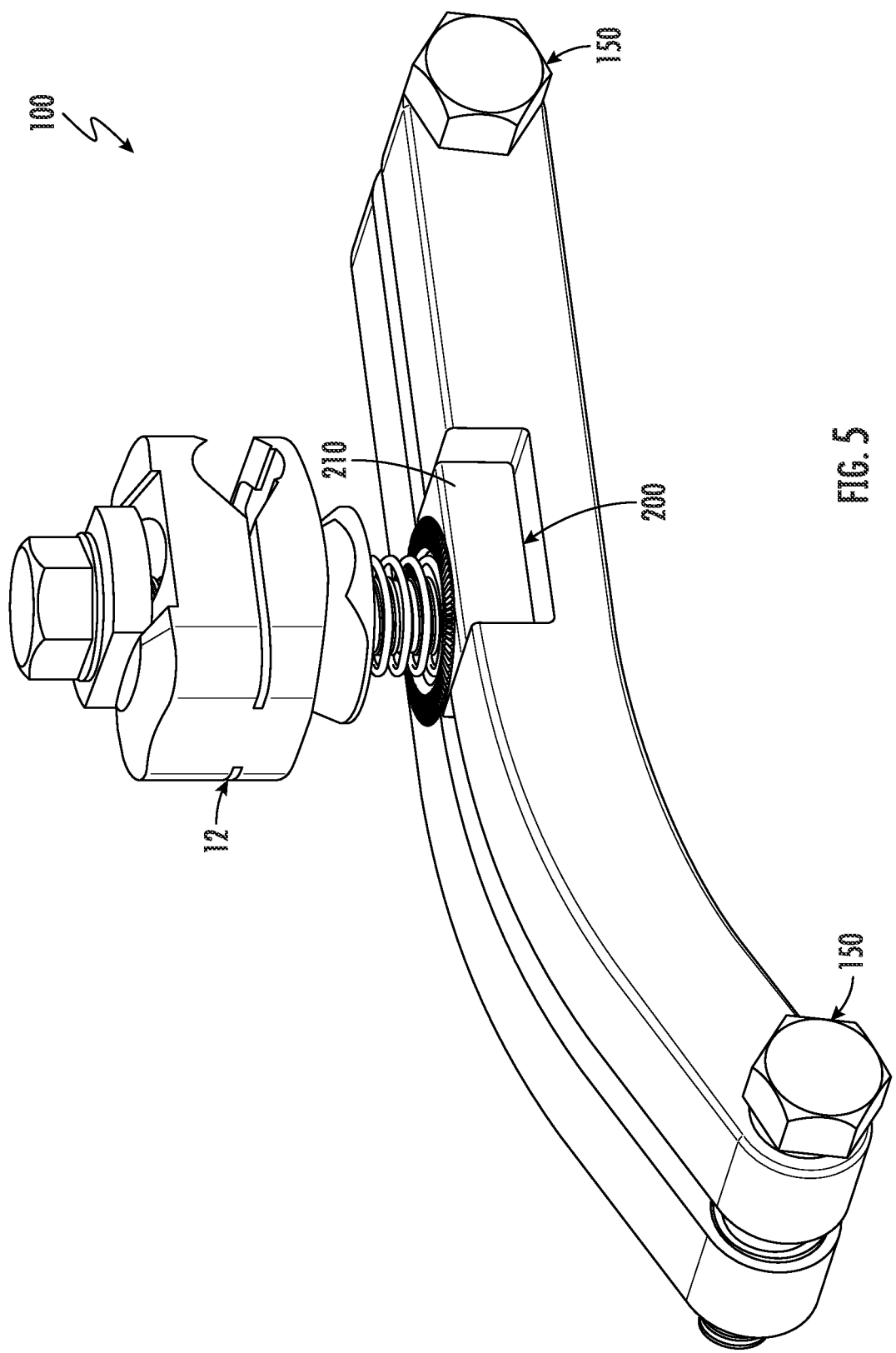
FIG. 5 illustrates a perspective view of an alternate example of an external fixation K-wire clamp in accordance with one or more features of the present disclosure.
Figure 6:
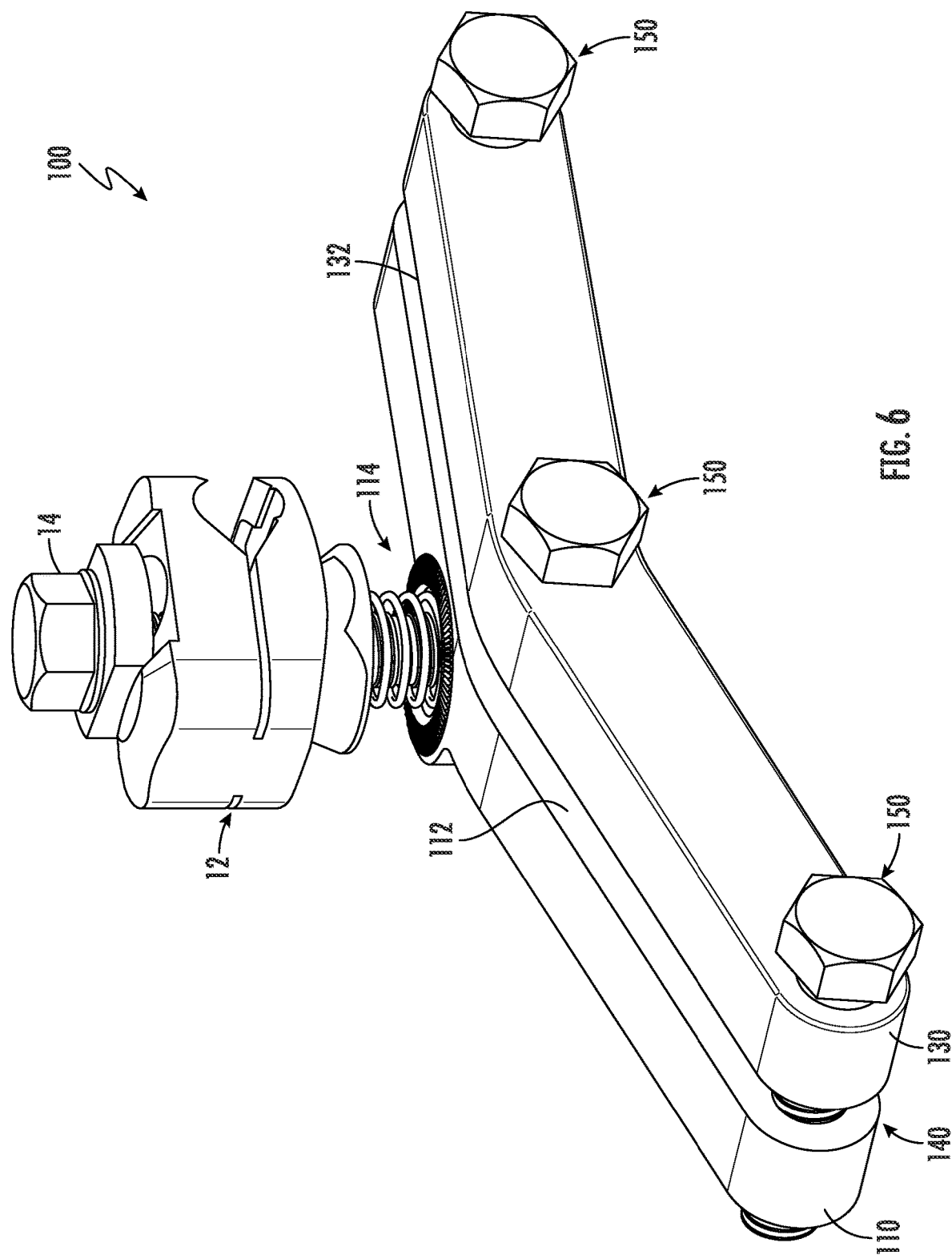
FIG. 6 illustrates a perspective view of an alternate example of an external fixation K-wire clamp in accordance with one or more features of the present disclosure.

Alternatively, with reference to FIGS. 5 and 6, a mini rod clamp 12 can be integrated into the external fixation K-wire clamp 100 to enable the external fixation K-wire clamp 100 to connect to a spanning rod of an external fixation system or construct without requiring a separate rod-to-rod clamp. For example, as illustrated in FIG. 5, the external fixation K-wire clamp 100 may include a slot 200 formed in a top surface thereof. In use, the slot 200 is arranged and configured to receive a plate member 210 associated with the mini rod clamp 12. Thus arranged, the external fixation K-wire clamp 100 may include an integrated centralized rod clamp. As illustrated in FIG. 6, a mini rod clamp 12 may be threadably coupled to the external fixation K-wire clamp 100. For example, as illustrated, the external fixation K-wire clamp 100 may include an offset threaded opening 114 for receiving a threaded screw associated with the mini rod clamp 12.

In accordance with one or more features of the present disclosure, a method 700 of using an external fixation K-wire clamp 100 in a distal radius fracture will now be described. It should be appreciated, that while the external fixation K-wire clamp 100 will be shown and described in connection with affixing a K-wire to a patient's hand or wrist (e.g., distal radius fractures), it is envisioned that the external fixation K-wire clamp 100 can be used in other locations such as, for example, in connection with small bones in the patient's foot.

Figure 7:
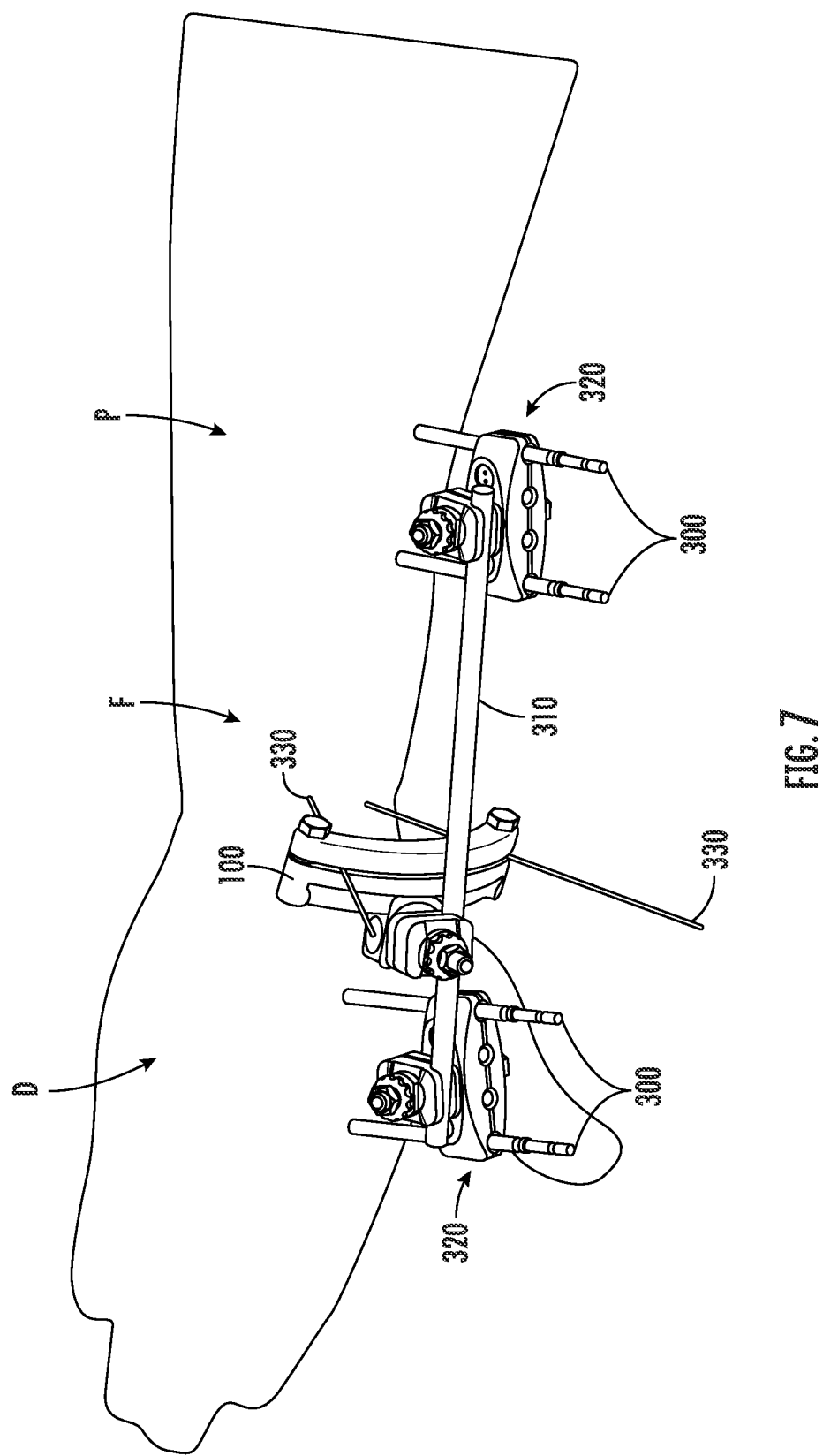
FIG. 7 illustrates a top perspective view of an external fixation system or construct including the external fixation K-wire clamp shown in FIGS. 4A-4D, the external fixation system or construct being used to affix a distal radius fracture in accordance with one or more features of the present disclosure.
Figure 8:
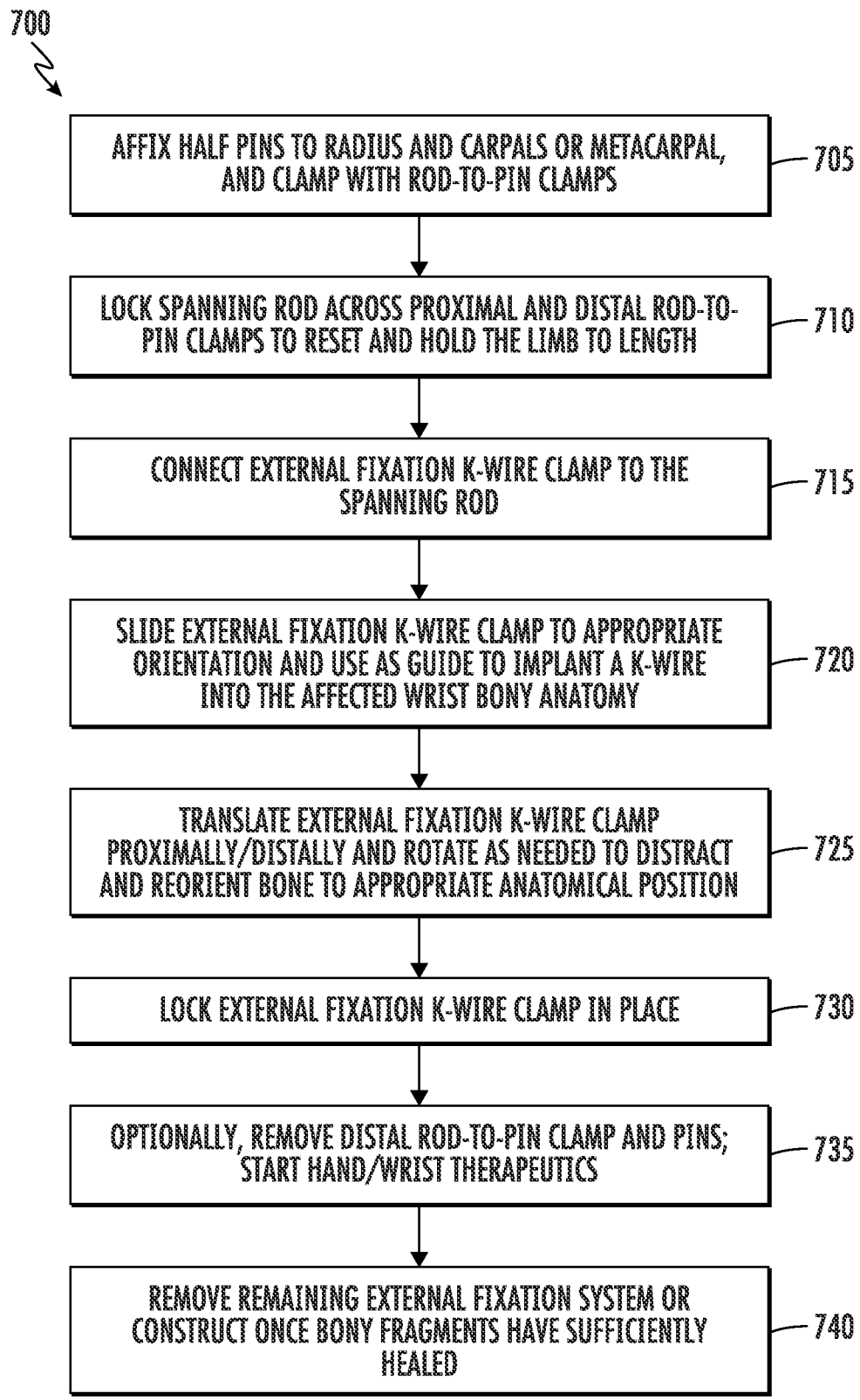
FIG. 8 is a flowchart of an example surgical technique used to affix and treat a patient's distal radius fracture in accordance with one or more features of the present disclosure.

With reference to FIGS. 7 and 8, in accordance with known surgical procedures, at step 705, threaded half-pins 300 may be inserted into the patient's bones on either side of the fracture site F. For example, as illustrated, threaded half-pins 300 may be inserted into the patient's radius and into the patient's carpals or metacarpal bones (e.g., threaded half-pins 300 may be implanted into the dorsal and radial sides of a patient's wrist/hand). Thereafter, the threaded half-pins 300 may be coupled with conventional rod-to-pin clamps 320. Next, at step 710, a spanning rod 310 may be coupled to each of the rod-to-pin clamps 320. Thus arranged, the spanning rod 310 and rod-to-pin clamps 320 form an external fixation system or construct used to reset and hold the patient's limb to length. As illustrated, the spanning rod 310 extends across the fracture site F. Thus, in use, conventional rod-to-pin clamps 320 can be secured to the proximal P and distal D sides of the fracture site F using conventional half-pins 300 (e.g., 3-4 mm half-pins). A spanning rod 310 can then be used to couple the proximal and distal rod-to-pin clamps 320.

In accordance with one or more features of the present disclosure, at step 715, one or more external fixation K-wire clamps 100 may be coupled to the spanning rod 310 either directly or using, for example, a rod-to-rod clamp such as, for example, rod-to-rod clamp 10. Next, at step 720, the external fixation K-wire clamp 100 can be moved (e.g., slid) to a desired position to orientate and guide the implantation of a K-wire 330 into the affected bony anatomy. As needed, at step 725, the external fixation K-wire clamp 100 can be translated proximally or distally and/or rotated to distract and reorient the patient's bone to appropriate anatomical position. Once proper positioning has been determined, at step 730, the external fixation K-wire clamp 100 can be locked to secure the K-wire 330 within the elongated channel 140 between the main body 110 and the plate member 130 of the external fixation K-wire clamp 100. As such, one or more K-wires 330 can be integrated with the external fixation system or construct.

As previously described, in use, a conventional rod-to-rod clamp 10 or other suitable mechanism can be used to couple the external fixation K-wire clamp 100 to the spanning rod 310 in between the proximal and distal rod-to-pin clamps 320. In use, by providing adjoining contacting surfaces 112, 132 devoid of any predefined grooves for wire placement, the external fixation K-wire clamp 100 enables one or more K-wires 330 to be inserted and secured therein. That is, a K-wire 330 can be inserted into, for example, the patient's radiocarpal bones. Thereafter, the K-wire 330 can be repositioned relative to the external fixation K-wire clamp 100 to reset the patient's bones as needed. Thereafter, the K-wire 330 can be locked in place by the external fixation K-wire clamp 100.

Next, in accordance with one or more features of the present disclosure, after a consolidation period, at step 735, the distal rod-to-pin clamp 320 and half-pins 300 associated therewith may be removed to enable the patient to begin hand/wrist therapeutics (e.g., the distal rod-to-pin clamp 320 and half-pins 300 can be decoupled from the spanning rod 310 and removed from the construct enabling the patient to begin hand/wrist therapeutics while the remaining portions of the construct remain in place, removing the distal clamp and pins enables earlier range of motion). In some examples, the distal rod-to-pin clamp 320 and half pins 300 can be removed partway through the bone consolidation process. Finally, at step 740, the remaining external fixation system or construct can be removed once the patient's bones have sufficiently healed. Thus arranged, in accordance with one or more features of the present disclosure, the surgical technique facilitates earlier hand/wrist therapeutics with portions of the external fixation system or construct remaining in place.

As described herein, the external fixation K-wire clamp 100 enables uniplanar fixation, however, it should be appreciated that the external fixation K-wire clamp 100 can be modified to permit multiplanar fixation of the radial and dorsal pins. For example, with reference to FIGS. 9 and 10, the external fixation K-wire clamp 100 may be configured with angled contacting surfaces 112, 132. That is, the contacting surfaces 112, 132, while parallel to each other, are angled relative to the main body 110 and the plate member 130. Thus arranged, the external fixation K-wire clamp 100 is configured with a multiplanar or angled contacting surfaces 112, 132 to mimic the natural volar tilt of a patient's distal radius bone (enable non-planar pin placement). As shown, in some examples, the angled contacting surfaces 112, 132 may be biplanar symmetric. Alternatively, the angled contacting surfaces 112, 132 may be biplanar asymmetric where one plane is normal to the screw axes and the other plane is inclined to the full volar angle, or a single curved radius.

While the present disclosure refers to certain examples, numerous modifications, alterations, and changes to the described examples are possible without departing from the sphere and scope of the present disclosure, as defined in the appended claim(s). Accordingly, it is intended that the present disclosure not be limited to the described examples, but that it has the full scope defined by the language of the following claims, and equivalents thereof. The discussion of any example is meant only to be explanatory and is not intended to suggest that the scope of the disclosure, including the claims, is limited to these examples. In other words, while illustrative examples of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more examples or configurations for the purpose of streamlining the disclosure. However, it should be understood that various features of the certain examples or configurations of the disclosure may be combined in alternate examples, or configurations. Any example or feature of any section, portion, or any other component shown or particularly described in relation to various examples of similar sections, portions, or components herein may be interchangeably applied to any other similar example or feature shown or described herein. Additionally, components with the same name may be the same or different, and one of ordinary skill in the art would understand each component could be modified in a similar fashion or substituted to perform the same function.

Moreover, the following claims are hereby incorporated into this Detailed Description by this reference, with each claim standing on its own as a separate example of the present disclosure.

As used herein, an element or step recited in the singular and proceeded with the word "a" or "an" should be understood as not excluding plural elements or steps, unless such exclusion is explicitly recited. Furthermore, references to "one example" of the present disclosure are not intended to be interpreted as excluding the existence of additional examples that also incorporate the recited features.

The phrases "at least one," "one or more," and "and/or" as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

We claim:

1. An external fixation system comprising:
    an external fixation K-wire clamp including:
        a main body including a first contacting surface and a rail positioned opposite the first contacting surface, the rail extending parallel to the first contacting surface, the rail being formed in, or affixed to, the main body, the rail being arranged and configured to be received by a channel formed in a rod-to-rod clamp for coupling the external fixation K-wire clamp to a spanning rod;
        a plate member including a second contacting surface parallel to the first contacting surface; and
        a mechanism for moving the plate member relative to the main body to selectively secure a position of a K-wire within an elongated channel between the first and second contacting surfaces.

2. The external fixation system of claim 1, wherein the mechanism for moving the plate member relative to the main body includes a plurality of fasteners for coupling the plate member to the main body.

3. The external fixation system of claim 2, wherein the external fixation K-wire clamp further comprises a plurality of biasing members positioned about the plurality of fasteners, respectively, the plurality of biasing members positioned in-between the plate member and the main body for biasing the plate member away from the main body.

4. The external fixation system of claim 3, wherein the plurality of biasing members are a compression or coiled spring.

5. The external fixation system of claim 1, wherein the first and second contacting surfaces are angled relative to the main body and the plate member.

6. The external fixation system of claim 1, wherein the main body and the plate member inclusive of the first and second contacting surfaces are curved.

7. The external fixation system of claim 1, wherein the rail enables repositioning of the external fixation K-wire clamp along any point along a length of the rail.

* * * * *